J. B. TIBBITS.
Cultivator.
No. 106,235.  Patented Aug. 9, 1870.
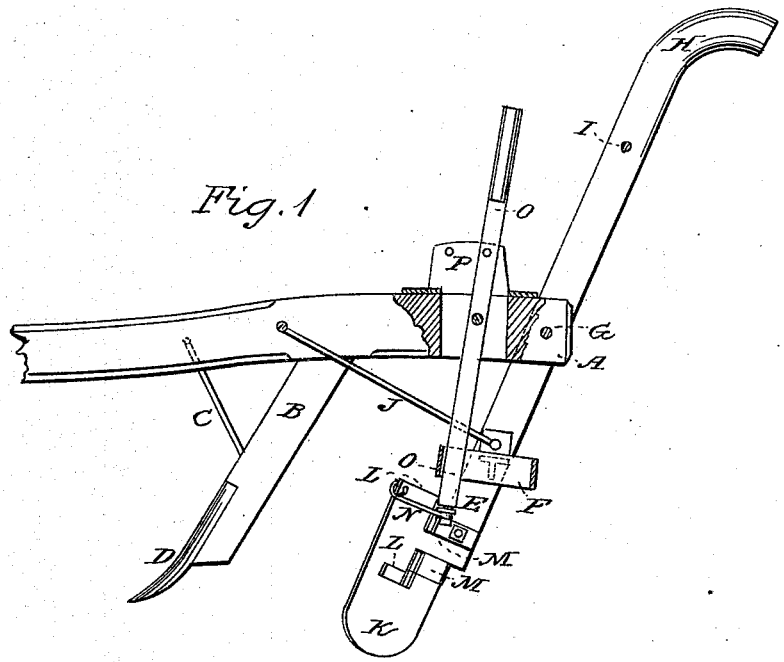
Fig. 1
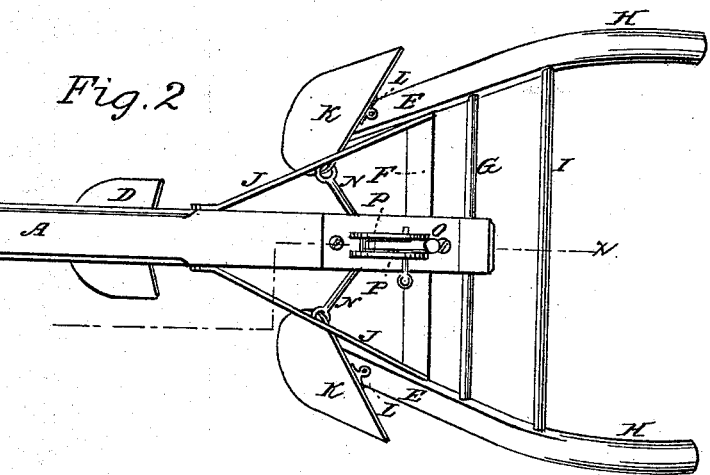
Fig. 2
Witnesses:
S. S. Mabee
Alex F. Roberts
Inventor:
Jas B Tibbits
per 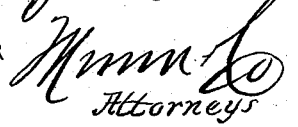
Attorneys

UNITED STATES PATENT OFFICE.

JAMES B. TIBBITS, OF PORTLAND, MICHIGAN, ASSIGNOR TO HIMSELF AND JOSEPH STEBBINS, OF SAME PLACE.

IMPROVEMENT IN CULTIVATORS.

Specification forming part of Letters Patent No. 106,235, dated August 9, 1870.

*To all whom it may concern:*

Be it known that I, JAMES B. TIBBITS, of Portland, in the county of Ionia and State of Michigan, have invented a new and useful Improvement in Cultivators; and I do hereby declare that the following is a full, clear, and exact description thereof, which will enable others skilled in the art to make and use the same, reference being had to the accompanying drawings, forming part of this specification.

Figure 1 is a side view of my improved cultivator, partly in section, through the line $x\ x$, Fig. 2. Fig. 2 is a top view of the same.

Similar letters of reference indicate corresponding parts.

My invention has for its object to improve the construction of horse hoes and cultivators, so that the hoes, shovels, or plows may be readily adjusted to turn the soil toward or from the plants, as may be desired; and it consists principally in hinging the hoes, shovels, or plows to the standards, as hereinafter more fully described.

A is the beam.

B is the forward or central standard, the upper end of which is attached to the beam A, and the draft strain upon which is sustained by the brace-bar C.

To the lower end of the standard B is attached a hoe, shovel, or plow, D, in the ordinary manner.

E are the side or rear standards, which are connected to each other and to the beam A by the bars or rounds F G.

H are the handles, which may be the extended upper ends of the standard E, or may be made separate from said standards, and which are connected by the cross-bar or round I. The draft strain upon the standards E is sustained by the braces J, the forward ends of which are attached to the beam A.

K are the adjustable hoes, shovels, or plows, to the middle part of the rear sides of which are attached eyes L, to receive the hooks M, which are secured to the standards E by straps, ferrules, or bolts, as may be desired or more convenient. One of the hooks M should be turned up and the other down, to guard against the plows becoming accidentally displaced. By this construction the plows may be turned to throw the soil toward or from the plants, as may be desired.

To the upper inside corners of the plows K are pivoted the outer ends of the bars or rods N, the inner ends of which are pivoted to the lower end of the lever O, which passes up through a cross-slot formed in the bar F, which serves as a guide and support to the lower end of the lever O, and which also limits the movement of the said lever. The lever O passes up through a slot in the rear part of the beam A, and is pivoted to said beam, as shown in Fig. 1. The upper end of the lever O projects upward into such a position that it may be conveniently reached and operated by the driver. The lever O is secured in place when adjusted by means of a pin, which passes through a hole in said lever and through one or the other of the holes in the plates or bars P, attached to the beam A, and which project upward upon the opposite sides of the said lever O.

Having thus described my invention, I claim as new and desire to secure by Letters Patent—

1. The combination of the hinges L M with the plows K and standards E, substantially as herein shown and described, and for the purposes set forth.

2. The combination, with the beam A and standards E, of the hinged plows K, bars or rods N, and pivoted adjustable lever O, all arranged to operate as specified.

JAMES B. TIBBITS.

Witnesses:
I. STEBBINS,
J. C. LITTLEFIELD.